(12) United States Patent
Motonaga

(10) Patent No.: US 12,236,570 B2
(45) Date of Patent: Feb. 25, 2025

(54) APPEARANCE INSPECTION SYSTEM AND APPEARANCE INSPECTION METHOD FOR TAPE PACKAGING OF ELECTRONIC COMPONENT DEVICES

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Ikuo Motonaga, Kitakyushu Fukuoka (JP)

(73) Assignees: Kabushika Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/902,758

(22) Filed: Sep. 2, 2022

(65) Prior Publication Data

US 2023/0298151 A1 Sep. 21, 2023

(30) Foreign Application Priority Data

Mar. 18, 2022 (JP) .................................. 2022-044151

(51) Int. Cl.
*G06T 7/00* (2017.01)
*G01N 21/88* (2006.01)
(Continued)

(52) U.S. Cl.
CPC ....... *G06T 7/0004* (2013.01); *G01N 21/8851* (2013.01); *G01N 21/95* (2013.01);
(Continued)

(58) Field of Classification Search
CPC ..................... G06T 7/0004; G06T 7/73; G06T 2207/10048; G06T 2207/30148; G01N 21/8851; G01N 21/95; H04N 23/56
See application file for complete search history.

(56) References Cited

U.S. PATENT DOCUMENTS 5,208,103 A * 5/1993 Miyamoto ................. C09J 7/35
  428/323
5,346,765 A * 9/1994 Maeda ............... H05K 13/0084
  428/323

(Continued)

FOREIGN PATENT DOCUMENTS

JP   2001074427 A   3/2001
JP   2003165506 A * 6/2003
(Continued)

*Primary Examiner* — Richard A Hansell, Jr.
(74) *Attorney, Agent, or Firm* — Kim & Stewart LLP

(57) ABSTRACT

According to one embodiment, an inspection system includes an infrared imaging device and a controller. The infrared imaging device is for acquiring an image of a thermocompression-bonded tape package with infrared light. The tape package comprises a first tape covering a second tape. The second tape can have a pocket for an electronic component. The controller is configured to receive the image of the thermocompression-bonded tape package and detect a state of thermocompression bonding in a predetermined region of the tape package based on the received image. For example, the inspection system may detect when the bonding of the first tape to the second tape is unsatisfactory or abnormal.

20 Claims, 13 Drawing Sheets

(51) Int. Cl.
  *G01N 21/95* (2006.01)
  *G06T 7/73* (2017.01)
  *H04N 23/56* (2023.01)

(52) U.S. Cl.
  CPC .............. *G06T 7/73* (2017.01); *H04N 23/56* (2023.01); *G06T 2207/10048* (2013.01); *G06T 2207/30148* (2013.01)

(56) References Cited

U.S. PATENT DOCUMENTS

| | | | | |
|---|---|---|---|---|
| 5,667,073 | A | * 9/1997 | Okui | H05K 13/0084 206/713 |
| 6,307,210 | B1 | * 10/2001 | Suzuki | G02B 27/40 250/559.34 |
| 2005/0243310 | A1 | * 11/2005 | Kato | G01N 21/8901 356/237.5 |
| 2019/0090354 | A1 | * 3/2019 | Shinohara | C09J 7/30 |
| 2021/0018446 | A1 | * 1/2021 | Terahai | G01N 21/95692 |
| 2021/0100144 | A1 | * 4/2021 | Takahashi | H05K 13/084 |

FOREIGN PATENT DOCUMENTS

| | | | | |
|---|---|---|---|---|
| JP | 3834702 | B2 | * 10/2006 | |
| JP | 2007108561 | A | 4/2007 | |
| JP | 2008224427 | A | * 9/2008 | ........... G01N 21/909 |
| JP | 2010256313 | A | * 11/2010 | |
| JP | 2012046218 | A | * 3/2012 | |
| JP | 2016070724 | A | 5/2016 | |

\* cited by examiner

APPEARANCE INSPECTION SYSTEM AND APPEARANCE INSPECTION METHOD FOR TAPE PACKAGING OF ELECTRONIC COMPONENT DEVICES

CROSS-REFERENCE TO RELATED APPLICATION

This application is based upon and claims the benefit of priority from Japanese Patent Application No. 2022-044151, filed Mar. 18, 2022, the entire contents of which are incorporated herein by reference.

FIELD

Embodiments described herein relate generally to an appearance inspection system and an appearance inspection method for semiconductor.

BACKGROUND

For packaging electronic components such as semiconductor devices, tape packaging using an embossed tape (embossed carrier tape) is often used. Such tape packaging is easy to handle and provides good mounting efficiency of electronic components, Thermocompression bonding is used for the tape packaging.

However, there is a possibility that failure of packaging may occur due to defective thermocompression bonding of tape packaging.

DETAILED DESCRIPTION

Figure 1:
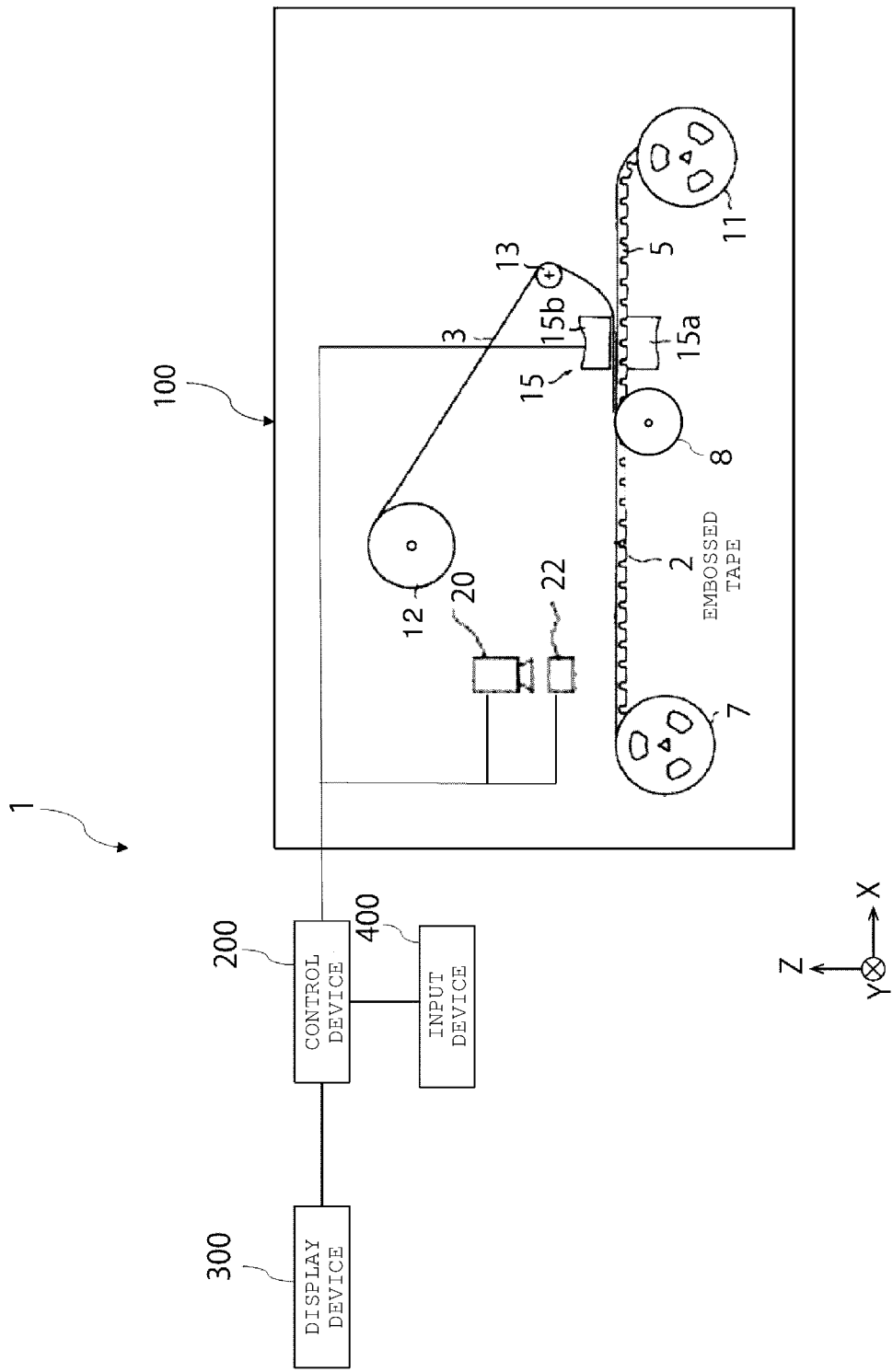
FIG. 1 illustrates an appearance inspection system according to an embodiment.

Embodiments provide an appearance inspection system and an appearance inspection method capable of detecting defective thermocompression bonding of taping packaging.

In general, according to one embodiment, an inspection system includes an infrared imaging device for acquiring an image of a thermocompression-bonded tape package with infrared light. The tape package has a first tape covering a second tape, which has a pocket for an electronic component. A controller is provided. The controller is configured to receive the image of the thermocompression-bonded tape package and detect a state of thermocompression bonding in a predetermined region of the tape package based on the received image.

Hereinafter, an appearance inspection system and an appearance inspection method according to certain example embodiment of the present disclosure will be described with reference to the drawings. Embodiments illustrated below are non-limiting examples, and the present disclosure is not limited to these example embodiments. In the drawings, the components, elements, or aspects which are the same or have substantially similar functions may be designated by the same reference symbols, and descriptions of repeated components, elements, or aspects may be omitted from the description of subsequently described drawings and/or embodiments. Furthermore, the drawings are conceptual and/or schematic, thus for the sake of convenience of description, the depicted dimensions, scales, dimensional ratios of different components, elements or aspects may differ drawing to drawing and from an actual embodiment. Likewise, parts of a configuration may be omitted from a drawing to provide representational clarity with respect to the particular aspects being described.

One Example Embodiment

FIG. 1 illustrates a configuration example of an appearance inspection system 1 according to an embodiment. The appearance inspection system 1 can detect a defect in thermocompression bonding of taping packaging (tape packaging) by inspection using infrared light or the like.

That is, the appearance inspection system 1 includes an appearance inspection device 100, a control device 200, and a display device 300. The appearance inspection device 100 can thermocompression-bond a cover tape 3 to an embossed tape 2 and can also perform infrared imaging of the thermocompression-bonded embossed tape 2. The embossed tape 2 may be referred to as a second tape, and the cover tape 3 may be referred to as a first tape. The thermocompression bonding of the cover tape 3 to the embossed tape 2 is referred to as taping packaging.

Figure 2A:
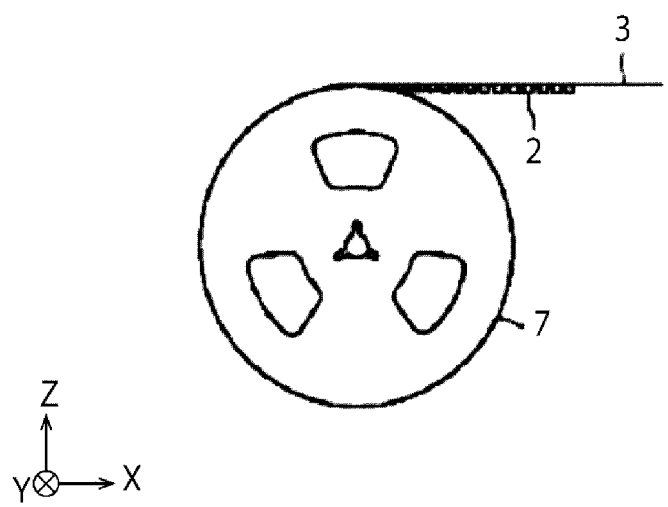
FIG. 2A is a view illustrating thermocompression-bonded embossed tape wound on a take-up reel.
Figure 2B:
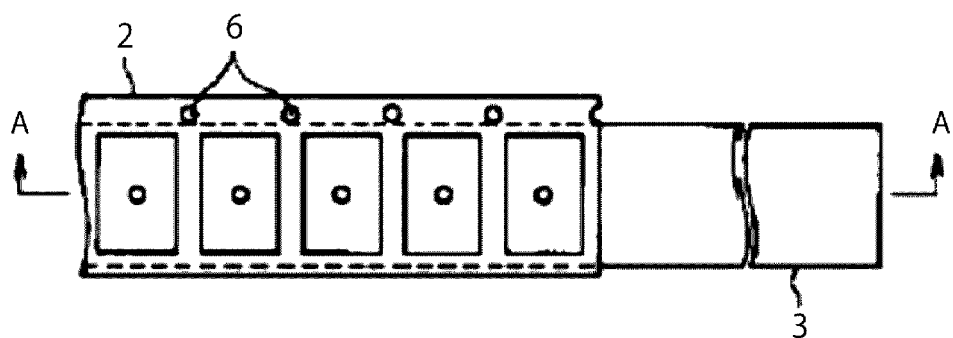
FIG. 2B is a plan view of a thermocompression-bonded embossed tape.
Figure 2C:
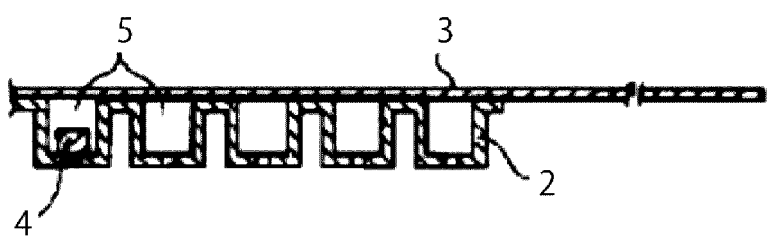
FIG. 2C is a cross-sectional view taken along line A-A of FIG. 2B.

The embossed tape 2 will be described with reference to FIGS. 2A to 2C. FIG. 2A is a view of the thermocompression-bonded embossed tape 2 wound on a take-up reel 7. FIG. 2B is a plan view of the thermocompression-bonded embossed tape 2. FIG. 2C is a cross-sectional view taken along line A-A of FIG. 2B.

As illustrated in FIGS. 2A to 2C, in the embossed tape 2, pockets 5 for accommodating electronic components 4 are continuously formed along the X direction (tape feeding direction) at regular intervals. The pockets 5 initially have an open upper surface to permit electronic components 4 to be placed inside the pockets 5. The embossed tape 2 is made of a material with a higher absorption of infrared light than the cover tape 3. The embossed tape 2 is made of, for example, a black material with a high absorbance of infrared light.

More specifically, the embossed tape 2 constitutes, for example, a carbon fiber reinforced plastic or a general-purpose plastic resin. The plastic resin is, for example, polystyrene resin (PS) such as general-purpose polystyrene resin (GPPS) or impact-resistant polystyrene resin (HIPS) to which rubber is added, polyethylencaterephthalate (PET), polypropylene (PP), polyvinyl chloride (PVC), acrylic resin (PMMA), acrylonitrile butadiene styrene (ABS), or the like. Then, guide holes 6 are continuously formed at one edge of the embossed tape 2 at regular intervals.

The cover tape 3 is, for example, a transparent or semi-transparent tape. The cover tape 3 is made of vinyl, polyethylene terephthalate (PET), polystyrene resin (PS), or the like. In this context, the term "transparent" or "semi-transparent" means that an interaction with infrared light is lower than for the embossed tape 2, such that what is on a lower surface side of the cover tape 3 can be seen by infrared light passing through the cover tape 3. The embossed tape 2 has a higher light absorption of infrared light than the cover tape 3, and is composed of a colored material or a material through which infrared light does not transmit substantially.

A width (a length in the Y direction) of the cover tape 3 is smaller than a width of the embossed tape 2 so as not to cover the guide holes 6. Therefore, when the cover tape 3 is properly overlapped on the embossed tape 2 so as to cover upper surface openings of the pockets 5 of the embossed tape 2 in which the electronic components 4 are accommodated, the cover tape 3 does not close (block) the guide holes 6. The electronic component 4 is a semiconductor device such as an integrated circuit (IC) chip or the like. As described above, the electronic component 4 being accommodated in the embossed tape 2 and then the cover tape 3 being overlapped on the embossed tape 2 and thermocompression-bonded is sometimes referred to as taping packaging or tape packaging. The present embodiment is not limited to accommodating just an electronic component 4 in the pocket 5. In other examples, something other than an electronic component 4 may be accommodated in a pocket 5 either instead of or along with an electronic component 4.

Referring back to FIG. 1, the appearance inspection device 100 includes reels 7 and 11, a sprocket 8, a roll 12, a rotary pulley 13, a thermocompression bonding device 15, an infrared imaging device 20, and an infrared light source 22.

The control device 200 controls the entirety of the appearance inspection system 1. That is, the control device 200 can control the appearance inspection device 100 and can determine a state of thermocompression bonding of the embossed tape 2. Details of the control device 200 will be described below. Thermocompression bonding may also be referred to as heat welding.

The display device 300 is, for example, a monitor. The display device 300 can display an infrared image of the embossed tape 2, and a determination of pass/failure of the embossed tape 2.

An input device 400 is composed of, for example, a keyboard, a mouse, and the like. The input device 400 can be used to set a feed pitch of the embossed tape 2 or the like.

The reel 7 includes, for example, a drive motor. Thereby, the reel 7 (wind-up reel) can wind thereon the embossed tape 2 to which the cover tape 3 has been thermocompression-bonded in synchronization with the rotation of sprocket 8 under the control of the control device 200.

The sprocket 8 includes tooth tips that engage with the guide holes 6. Then, the sprocket 8 rotates under the control of the control device 200. Thereby, the embossed tape 2 is intermittently fed at a predetermined pitch by rotational drive of the sprocket 8.

The embossed tape 2 is initial wound on the reel 11 (feed reel). The cover tape 3 is initially wound on the roll 12 (cover tape feed reel).

Figure 3:
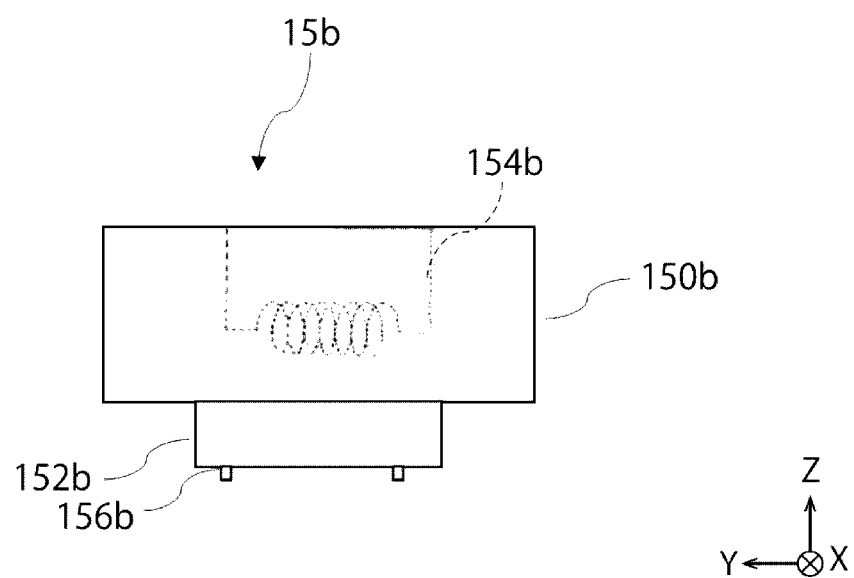
FIG. 3 depicts a welding head of a thermocompression bonding device.

The thermocompression bonding device 15 operates under the control of the control device 200 and includes a pedestal 15a and a welding head 15b. FIG. 3 is a view illustrating a configuration example of the welding head 15b of the thermocompression bonding device 15.

As illustrated in FIG. 3, the welding head 15b includes a heating unit 150b and a thermocompression bonding head 152b. The heating unit 150b includes a built-in heater 154b. The thermocompression bonding head 152b includes a pair of leg portions 156b projecting from a lower surface and extending in a band shape along the X direction (a tape feeding direction). The lower surfaces of the leg portions 156b are heated to, for example, 160 degrees by the heating unit 150b and thus function as a pair of welding surfaces.

Figure 4:
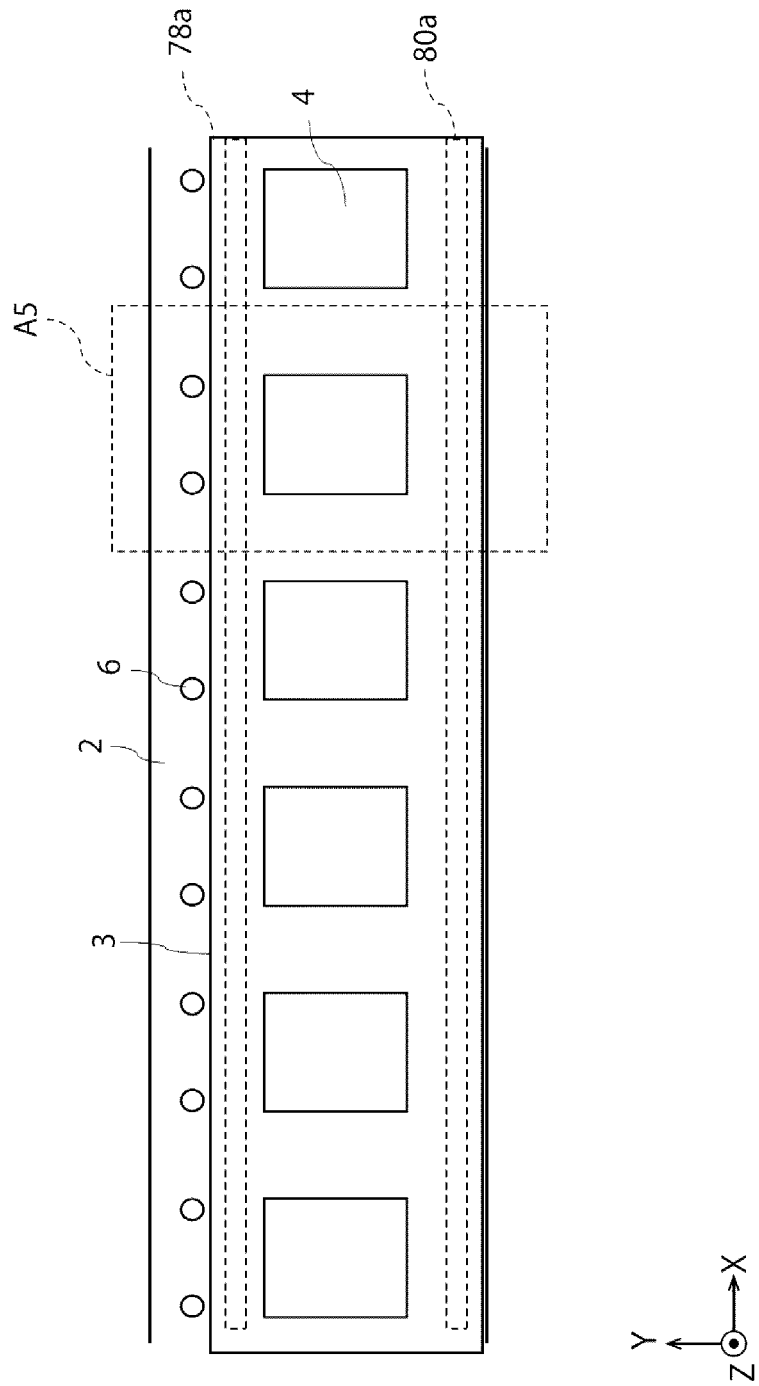
FIG. 4 is a plan view of a cover tape overlapped on an embossed tape.

FIG. 4 is a plan view illustrating a state in which the cover tape 3 is overlapped on the embossed tape 2. Regions 78a and 80a are welding regions where the pair of welding surfaces of the leg portions 156b contact the cover tape 3. That is, the regions 78a and 80a are regions where the cover tape 3 is overlapped on the embossed tape 2. Each time the regions 78a and 80a are intermittently fed to the region A5 directly below the welding head 15b, the welding head 15b descends toward the pedestal 15a, and the pair of welding surfaces of the leg portions 156b thermocompression-bond the regions 78a and 80a.

A length of intermittent feeding is, for example, about 1 to ⅓ of a length of the welding surface of the thermocompression bonding device 15 in the X direction. Thereby, thermocompression bonding is performed, for example, 1 to 3 times on the regions 78a and 80a where the embossed tape 2 and the cover tape 3 having the same length as the pair of welding surfaces of the leg portion 156b overlap each other.

Figure 5:
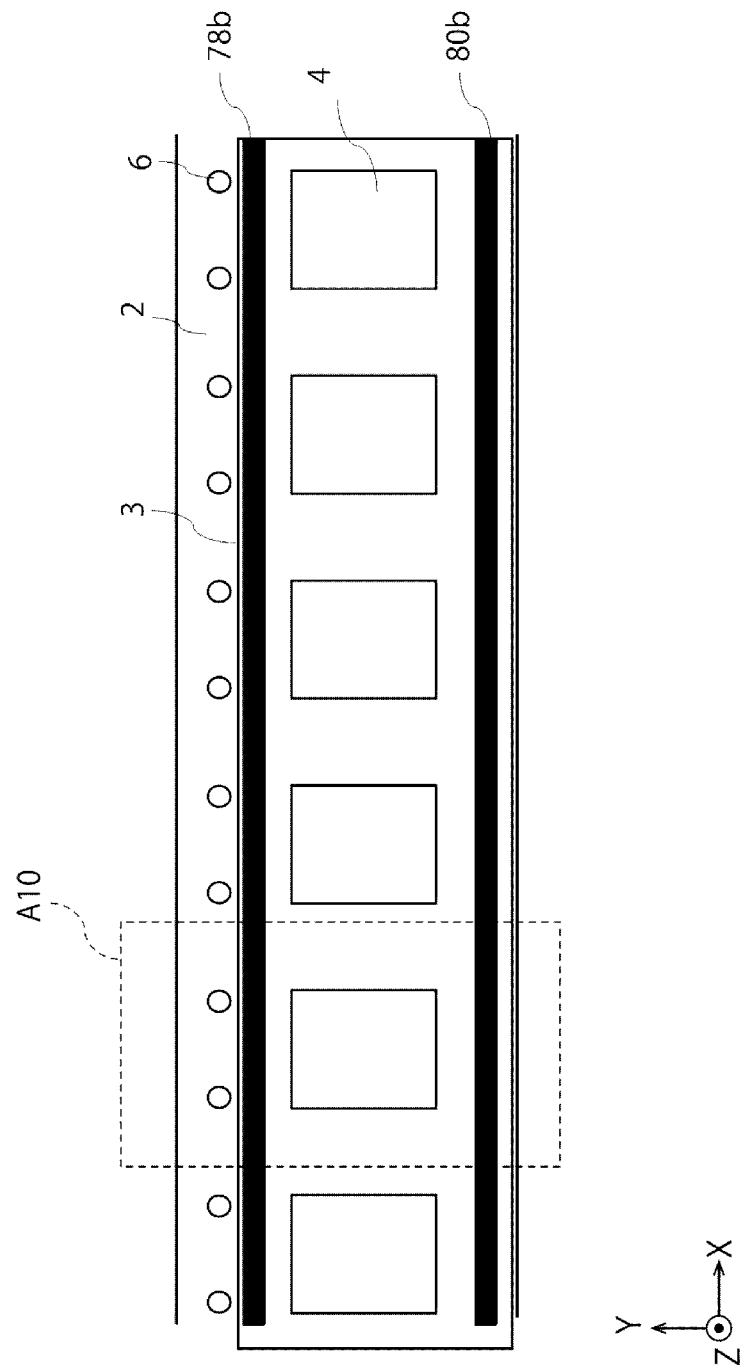
FIG. 5 is a plan view after a cover tape is thermocompression-bonded to an embossed tape.

FIG. 5 is a plan view illustrating the cover tape 3 thermocompression-bonded to the embossed tape 2. Left and right regions 78b and 80b of the cover tape 3 are thermocompression-bonded regions. In the regions 78b and 80b, materials of the embossed tape 2 and the cover tape 3 have been heat-welded to be integrated (joined or fused together). A region A10 indicates an imaging range of the infrared imaging device 20.

Referring back to FIG. 1, the infrared imaging device 20 operates under the control of the control device 200, and is composed of, for example, a Bayer-arranged CCD including R (red), G (green), and B (blue) pixels. A color filter of each of the R, G, and B pixels transmits light in an infrared region therethrough.

Figure 6:
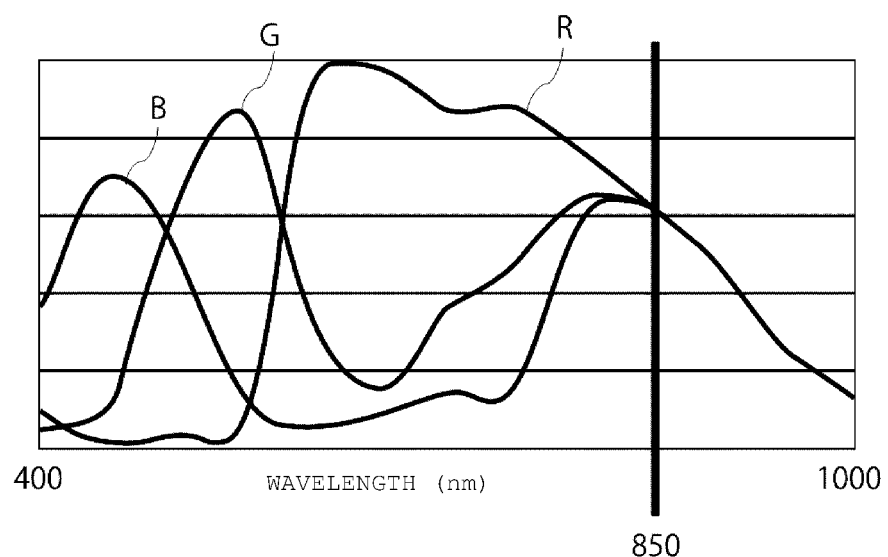
FIG. 6 is a diagram illustrating sensitivity characteristics of an infrared imaging device.

FIG. 6 is a diagram illustrating sensitivity characteristics of the infrared imaging device 20. A vertical axis indicates sensitivity (arbitrary unit) of the R, G, and B pixels, and a horizontal axis indicates a wavelength detected. As illustrated in FIG. 6, the infrared imaging device 20 has, for example, a wavelength of 850 nanometers in an infrared region and has sensitivity in a wavelength range of 750 to 900 nanometers. As described above, it is desirable that a wavelength range of infrared light at which the infrared imaging device 20 exhibits effective sensitivity includes 750 to 900 nanometers.

Figure 7:
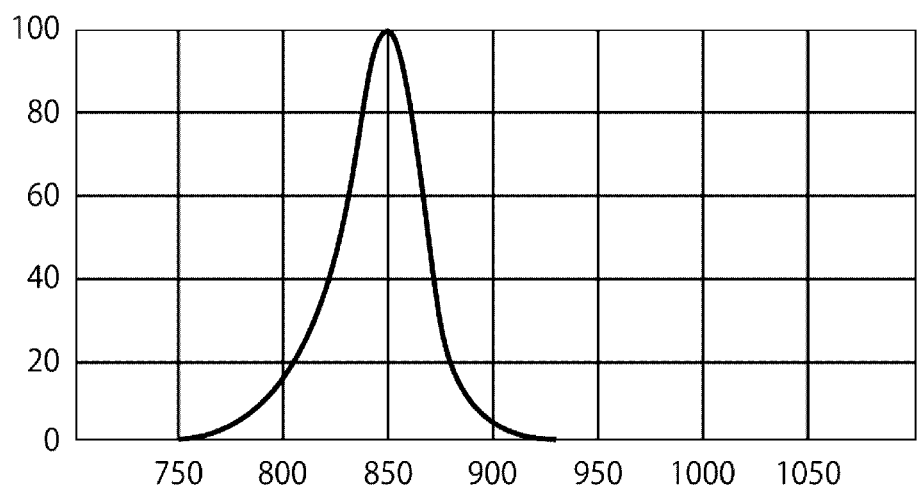
FIG. 7 is a diagram illustrating wavelength characteristics of an infrared light source.

Referring back to FIG. 1, the infrared light source 22 operates under the control of the control device 200. FIG. 7 is a diagram illustrating wavelength characteristics of the infrared light source 22. A vertical axis illustrates light emission intensity (arbitrary unit), and a horizontal axis illustrates a wavelength. As illustrated in FIG. 7, light emission intensity of the infrared light source 22 has a peak at 850 nanometers in an infrared region.

Referring back to FIG. 1, the infrared imaging device 20 captures an image in the region A10 illuminated by the infrared light source 22 under the control of the control device 200 whenever the thermocompression-bonded embossed tape 2 and the cover tape 3 are fed to the region A10 (see FIG. 5). The infrared imaging device 20 stores the captured image in a memory unit 202 of the control device 200.

Figure 8:
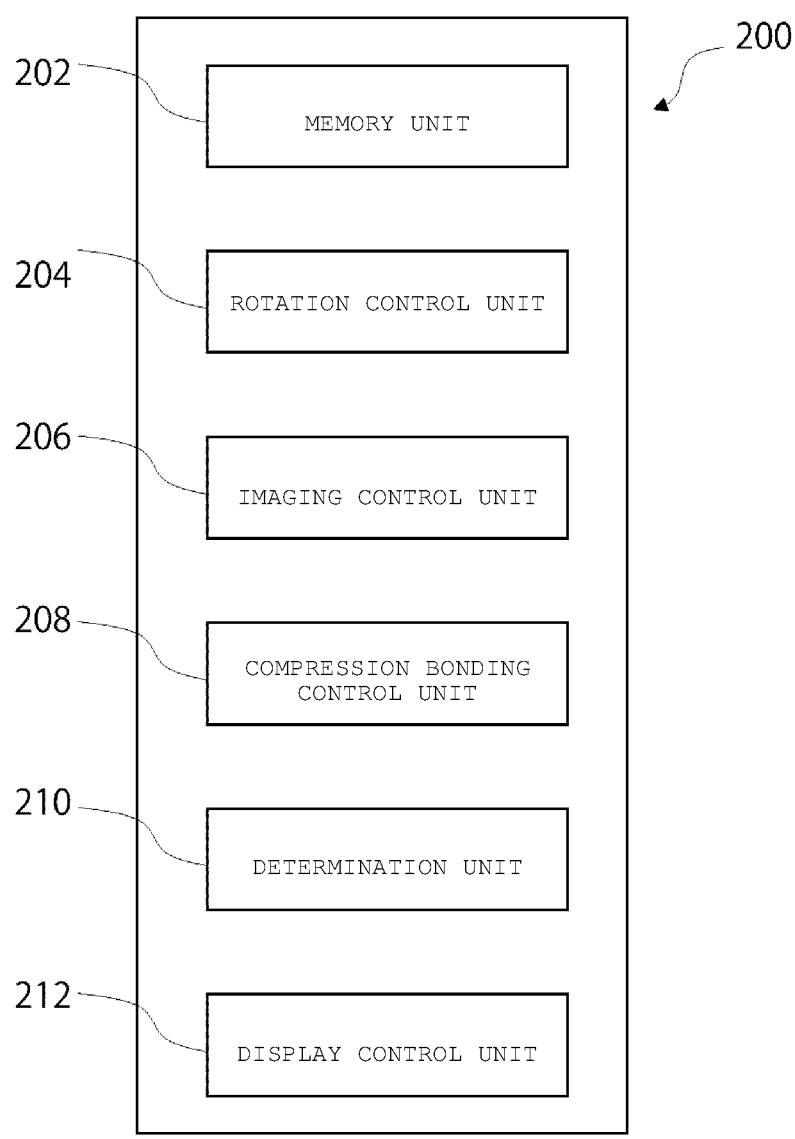
FIG. 8 is a block diagram illustrating a configuration of a control device.

FIG. 8 is a block diagram illustrating a configuration of the control device 200. The control device 200 can be, for example, a microcontroller including a central processing unit (CPU), a memory unit 202, and the like. The control device 200 performs control according to a program stored in the memory unit 202. That is, the control device 200 is configured with a rotation control unit 204, an imaging control unit 206, a compression bonding control unit 208, a determination unit 210, and a display control unit 212 according to the execution of the program stored in the memory unit 202. In other examples, the rotation control unit 204, the imaging control unit 206, the compression bonding control unit 208, the determination unit 210, and/or the display control unit 212 may be configured as an electronic circuit or a separate processing unit.

A memory unit 202 and stores various types of information for the appearance inspection system 1. The memory unit 202 stores information of, for example, a rotation speed and a rotation position of the reel 7, a rotation speed and a rotation position of the sprocket 8, a vertical position of the thermocompression bonding device 15, image data from the infrared imaging device 20, and the like.

The rotation control unit 204 performs control to rotate the reel 7 and the sprocket 8 in synchronization with each other according to a feed pitch of the embossed tape 2 set by the input device 400. Further, positions of the regions 78b and 80b infrared-imaged in the region A10 (see FIG. 5) based on the rotation information of the reel 7 and the sprocket 8 are stored in the memory unit 202 in association with positions of the guide holes 6. Further, the rotation control unit 204 according to the present embodiment assigns numbers from the first guide hole 6 to the last guide hole 6 of the embossed tape 2 and tracks the position of the embossed tape 2 based on the assigned numbers.

The imaging control unit 206 controls the infrared imaging device 20 to image the regions 78b and 80b in the region A10 (see FIG. 5) in synchronization with intermittent feeding of the embossed tape 2. The imaging control unit 206 also controls light emission of the infrared light source 22. The imaging control unit 206 stores the image data captured by the infrared imaging device 20 in the memory unit 202 in association with the positions (numbers) of the guide holes 6 of the embossed tape 2 according to information of the rotation control unit 204.

The compression bonding control unit 208 controls a vertical movement of the welding head 15b of the thermocompression bonding device 15 in synchronization with the intermittent feeding of the embossed tape 2.

The determination unit 210 detects the states of the regions 78b and 80b (see FIG. 5) by using an infrared image captured by the infrared imaging device 20. Further, the determination unit 210 also inspects a position, an appearance, and the like of the electronic component 4 in the pocket 5 by using the infrared image captured by the infrared imaging device 20 and detects a position state of the electronic component 4 inside the pocket 5.

The display control unit 212 causes the display device 300 to display a determination result from the determination unit 210 together with the infrared image captured by the infrared imaging device 20. For example, the display control unit 212 causes the display device 300 to display the infrared image and determination information when an abnormality is detected by the determination unit 210.

Figure 9:
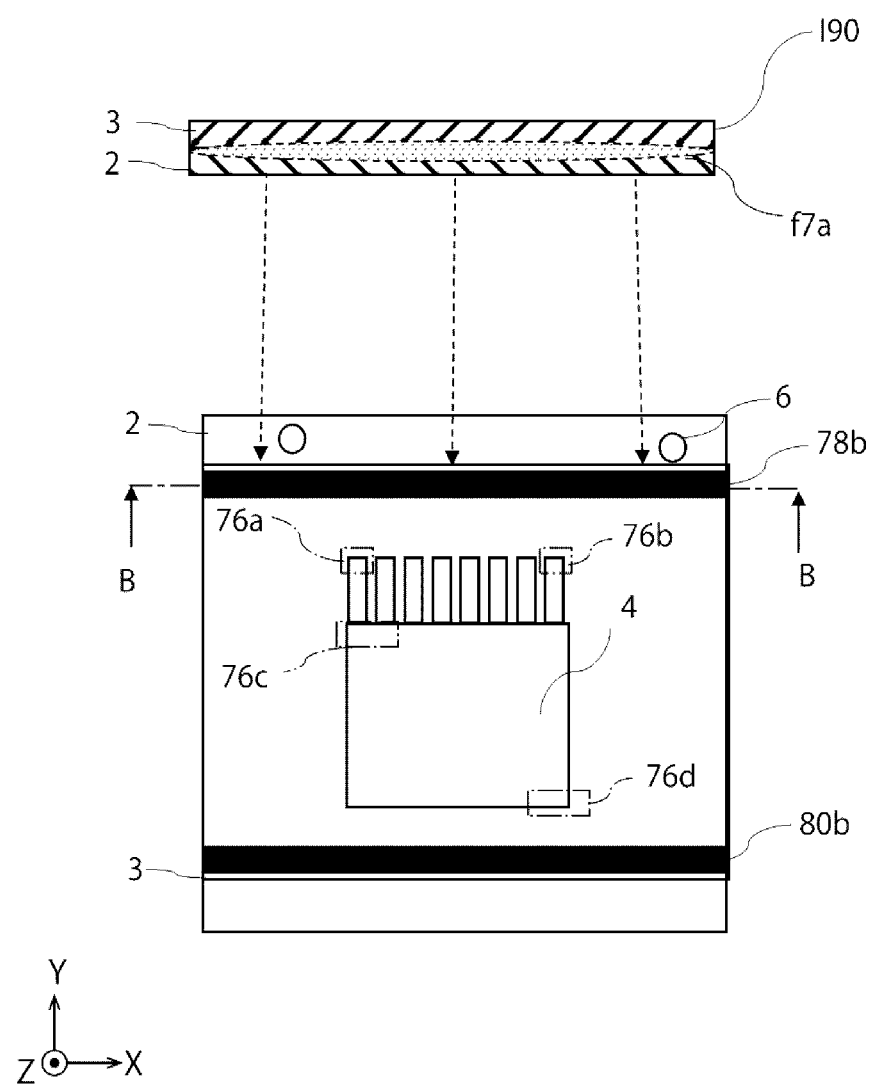
FIG. 9 depicts an infrared pickup image in a region when a determination state is good.

FIG. 9 is a view illustrating an example of an infrared pickup image in the region A10 (see FIG. 5) when the detected state is "good". A cross-section image 190 is a view schematically illustrating what a cross-section corresponding to the analysis image at a cross section line B-B would be expected to look like. When the regions 78b and 80b are in a good state of thermocompression bonding, an upper surface of the embossed tape 2 and a lower surface of the cover tape 3 are fused to form an integrated fusion region f7a. When performing infrared imaging, the fusion region f7a is imaged as black (appears black). That is, an absorption of the fusion region f7a with respect to infrared light emitted from the infrared light source 22 is higher than the other regions.

Regions 76a and 76b indicate determination regions of lead positions of the electronic component 4. Regions 76c and 76d indicate determination regions of a main body portion of the electronic component 4. In the example of FIG. 9, head regions at both ends of a lead are appropriately placed in the regions 76a and 76b. Further, the example of FIG. 9 is an example in which diagonally positioned regions of a main body (e.g., opposite corners) are appropriately placed in the regions 76c and 76d.

In broadband visible imaging, visible light does not substantially penetrate the cover tape 3, and it is difficult to perform an internal inspection of the electronic component 4 in the pocket in a state where the cover tape 3 is already overlapped on the embossed tape 2. In contrast to this, the appearance inspection device 100 includes the infrared imaging device 20, and thus, the inside of the pocket 5 can be imaged even with the cover tape 3 already overlapped on the embossed tape 2. Thereby, the appearance inspection device 100 can perform an internal inspection with the cover tape 3 overlapped on the embossed tape 2.

Figure 10:
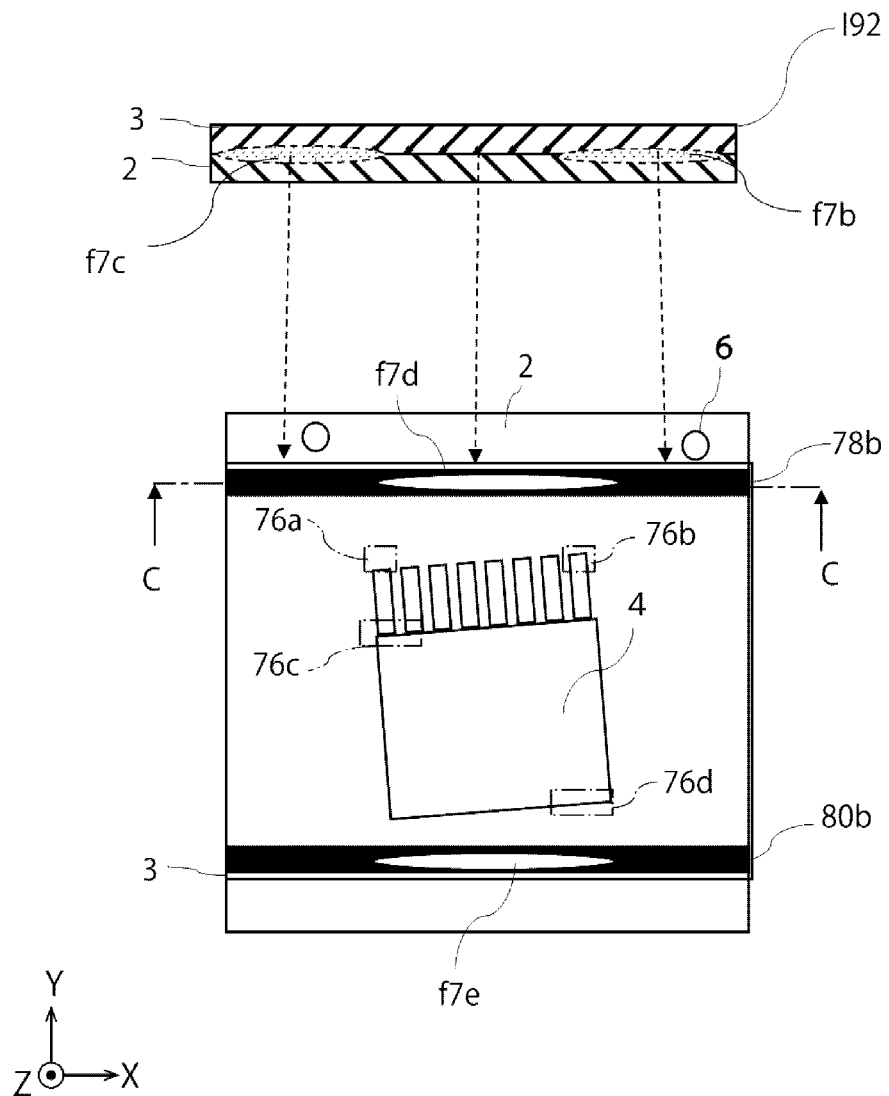
FIG. 10 depicts an infrared pickup image in a region when a determination state is not good.

FIG. 10 is a view illustrating an example of an infrared pickup image in the region A10 (see FIG. 5) when a determination state is "not good". A cross section image 192 is a view schematically what a cross-section corresponding to the analysis image at a cross section line C-C would be expected to look like. When thermocompression bonding states of regions 78b and 80b are not good, fusion regions f7b and f7c in which an upper surface of the embossed tape 2 and a lower surface of the cover tape 3 are fused and integrated are formed in only parts of the regions 78b and 80b. In other words, when the thermocompression bonding states of the regions 78b and 80b are not good, the upper surface of the embossed tape 2 and the lower surface of the cover tape 3 have regions that are not fused together and not integrated. When performing infrared imaging, the fusion regions f7b and f7c appear as black regions. Regions where the fusion regions f7b and f7c are not formed appear as white regions f7d and f7e.

That is, absorption of the fusion regions f7b and f7c with respect to infrared light emitted from the infrared light source 22 is higher than absorption of the other regions. Where the fusion regions f7b and f7c are not formed, the absorption of infrared light is lower than the fusion regions f7b and f7c. Reflectance of infrared light from the regions where the fusion regions f7b and f7c are not formed can be higher than the infrared reflectance of the fusion regions f7b and f7c.

In the example of FIG. 10, the electronic component 4 is also tilted (askew). Therefore, head regions at both ends of a lead are not appropriately placed inside the regions 76a and 76b. Likewise, diagonal regions of a main body are not appropriately placed inside the regions 76c and 76d.

Figure 11:
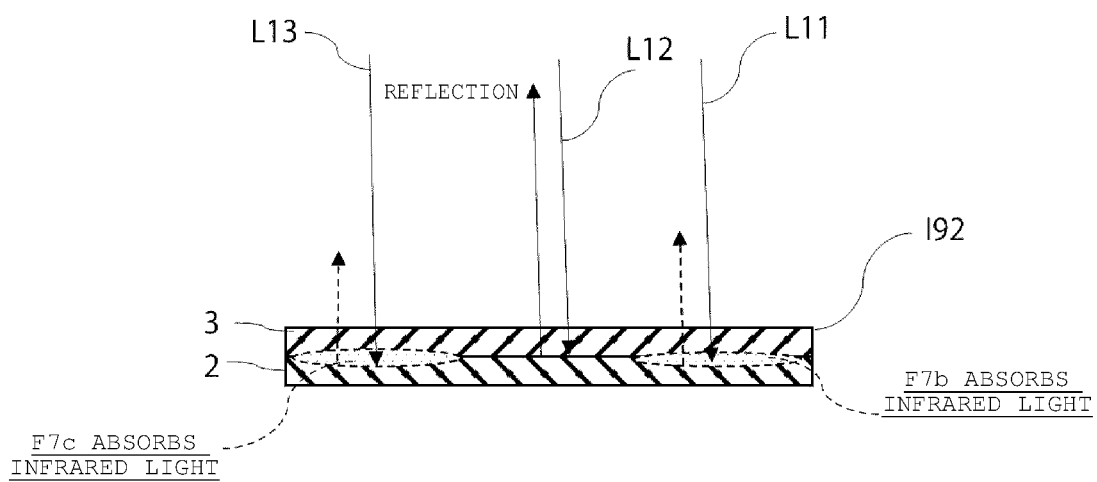
FIG. 11 is a view schematically illustrating a blackening phenomenon.

FIG. 11 is a view schematically illustrating a blackening phenomenon. As illustrated in FIG. 11, infrared light L11 and L13 incident on the fusion regions f7b and f7c are absorbed into the fusion regions f7b and f7c and reflection thereof is prevented. The infrared light L12 incident outside the fusion regions f7b and f7c is reflected from an upper surface of the embossed tape 2 or an upper surface of the electronic component 4 and is imaged. Details of such a phenomenon are being analyzed, but it is considered that a black color of the embossed tape 2 is fused with the cover tape 3 and a black region approaches an upper surface side of the cover tape 3 to increase an absorption of infrared light and reduce the reflected light.

Figure 12:
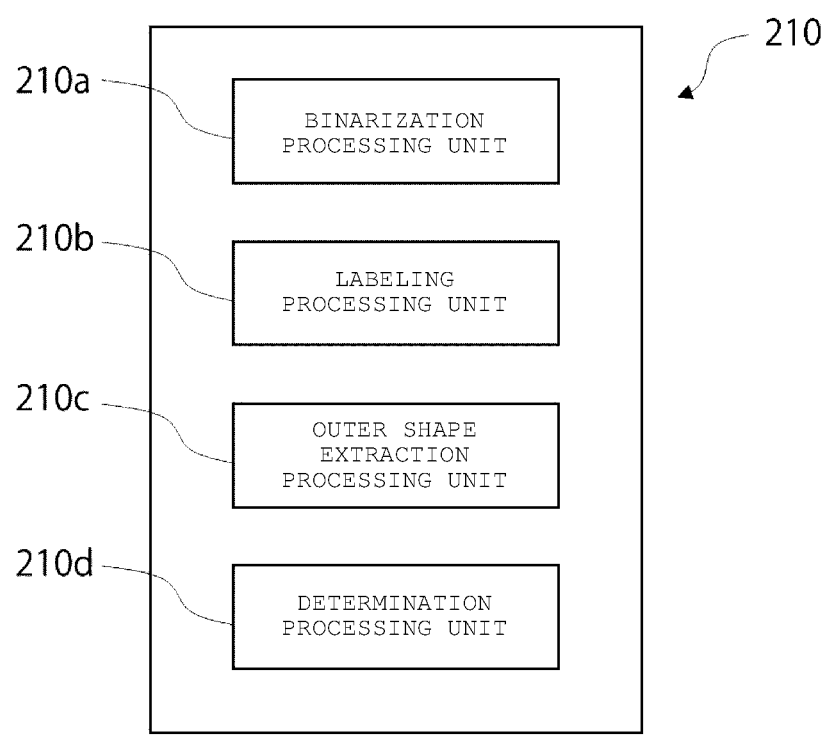
FIG. 12 is a block diagram of a determination unit.

FIG. 12 is a block diagram illustrating a configuration example of the determination unit 210. As illustrated in FIG. 12, the determination unit 210 includes a binarization processing unit 210a, a labeling processing unit 210b, an outer shape extraction processing unit 210c, and a determination processing unit 210d.

The binarization processing unit 210a extracts images corresponding to the regions 78b and 80b from the images in the region A10 (see FIG. 5). Then, the binarization processing unit 210a binarizes the image extracted experimentally according to a predetermined threshold value.

The labeling processing unit 210b labels black regions corresponding to the fusion regions f7a, f7b, and f7c (see FIGS. 9 and 10) from the image region binarized by the binarization processing unit 210a. Then, the labeling processing unit 210b counts the number of pixels in the labeled black regions.

The outer shape extraction processing unit 210c extracts a circumscribed contour line of the image region inside compression bonding regions 78b and 80b. Such a circumscribed contour line can be processed by general image processing.

The determination processing unit 210d determines compression bonding states of the regions 78b and 80b based on the number of pixels counted by the labeling processing unit 210b. The determination processing unit 210d determines, for example, that thermocompression bonding of the predetermined regions 78b and 80b is in a failed state ("not good") when a ratio of black regions occupying the predetermined regions 78b and 80b is less than or equal to some predetermined value. More specifically, the determination processing unit 210d determines that compression bonding is in a good state when the number of pixels counted by the labeling processing unit 210b is greater than a first threshold value. If the number of counted pixels is smaller than a second threshold value, which is a value smaller than the first threshold value, the determination processing unit 210d determines that compression bonding is in a failed state. Setting of a threshold value is not particularly limited, and, for example, the first threshold value and the second threshold value may be set to the same value, or additional threshold values may be set according to additional states to be detected or the like. By increasing the number of threshold values, determination of the compression bonding state can be further subdivided beyond a good/bad determination.

Further, the determination processing unit 210d determines that a position of the electronic component 4 is in a good state when right-angled contour lines along a predetermined direction are respectively placed in the regions 76a, 76b, 76c, and 76d, based on the circumscribed contour lines extracted by the outer shape extraction processing unit 210c. The determination processing unit 210d determines that the position of the electronic component 4 is in a failed state when the right-angled contour lines in a predetermined direction are not respectively placed in the regions 76a, 76b, 76c, and 76d.

Figure 13:
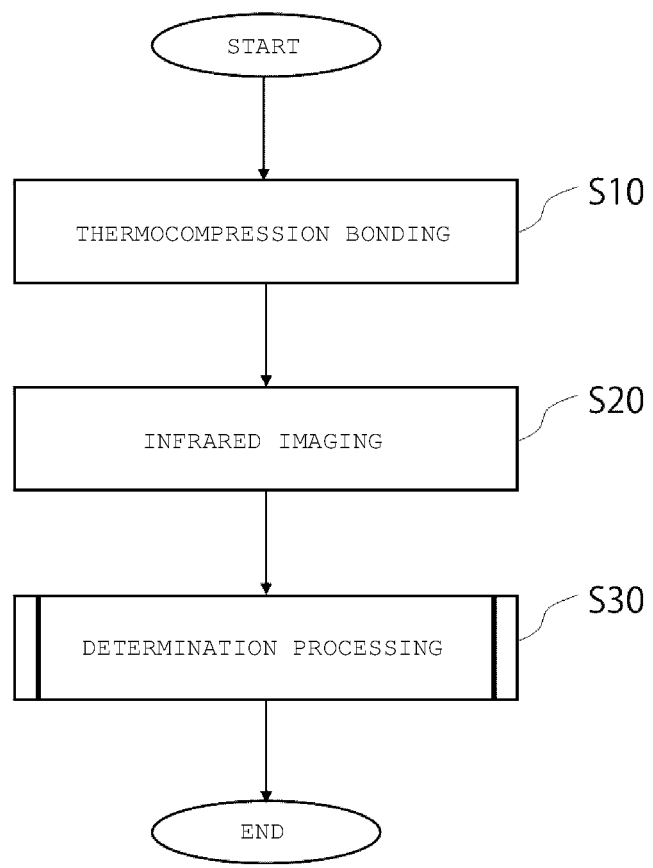
FIG. 13 is a flowchart of an operation of a control device.
Figure 14:
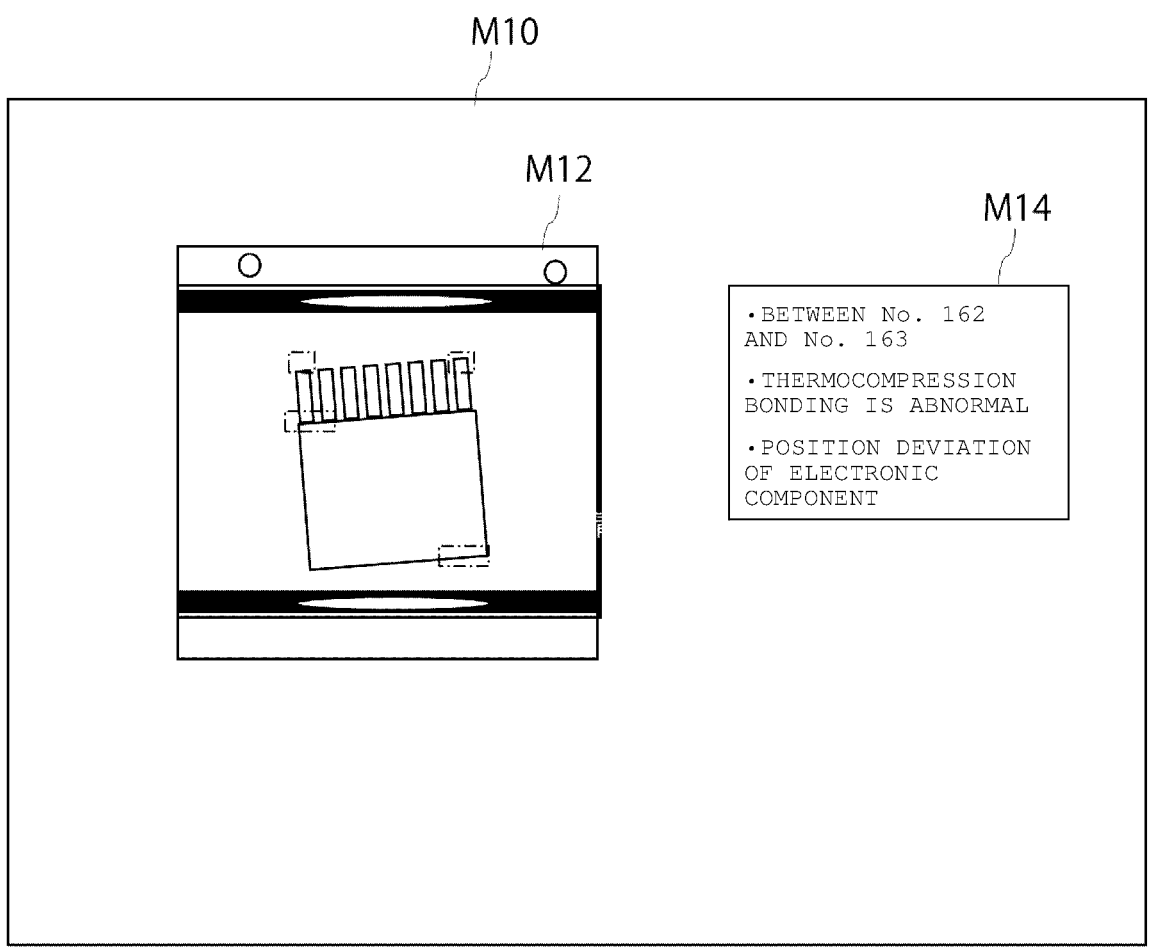
FIG. 14 depicts an example of a display image of a display device when an abnormality is determined by a determination unit.
Figure 15:
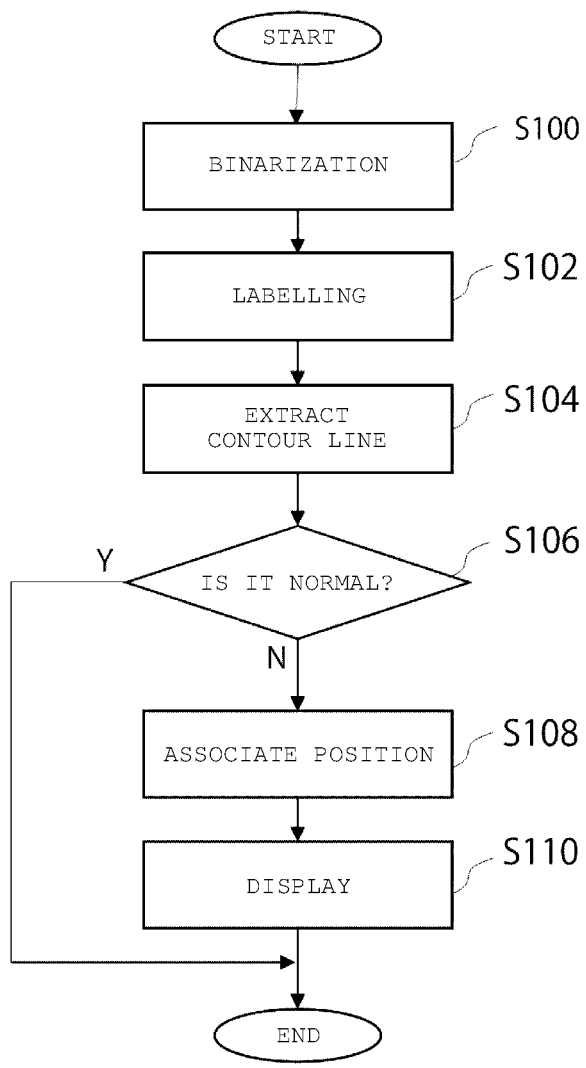
FIG. 15 is a flowchart of a determination processing.

The above description is made for a configuration of the appearance inspection system 1. A control example of the control device 200 will be described below with reference to FIGS. 13 to 15. FIG. 13 is a flowchart illustrating a control example of the control device 200. FIG. 14 is a view illustrating an example of a display image of the display device 300 when the determination unit 210 determines to be abnormal. FIG. 15 is a flowchart illustrating a detailed processing example of step S30 of FIG. 13.

As illustrated in FIG. 13, the rotation control unit 204 of the control device 200 rotates the reel 7 and the sprocket 8 in synchronization with each other according to a feed pitch of the embossed tape 2. Thereby, when the embossed tape 2 and the cover tape 3 are intermittently fed and are located in the lower region A5 (see FIG. 4) of the welding head 15b, the tape feeding is interrupted. Then, a pair of welding surfaces of the leg portions 156b heated to a constant temperature, for example, 160 degrees, are moved by the heating unit 150b to press and weld an overlapped portion overlapped with the embossed tape 2 in the left and right regions 78a and 80a of the cover tape 3. That is, the welding surfaces are thermocompression-bonded, and an upper surface opening of the pocket 5 of the embossed tape 2 is sealed with the cover tape 3 (step S10). In this way, the electronic component 4 is taping packaging by sealing the upper surface opening of the pocket 5 of the embossed tape 2 with the cover tape 3.

After pressing and welding, when the welding head 15b ascends to be separated from the cover tape 3, the embossed tape 2 is fed from the reel 11 under the welding head 15b by driving of the sprocket 8, and the cover tape 3 is fed from the roll 12 by folding back the rotary pulley 13. Thereby, the cover tape 3 is put on the embossed tape 2, and the welding head in a heated state descends again to press and weld the embossed tape 2 and the cover tape 3. That is, the welding surfaces thermocompression-bond the embossed tape 2 and the cover tape 3. Ascending and descending of the welding head 15b and feeding of the embossed tape 2 and the cover tape 3 are repeated, and thereby, the thermocompression-bonded embossed tape 2 and the cover tape 3 are sequentially wound on to the reel 7.

The imaging control unit 206 causes the infrared light source 22 to emit light and the infrared imaging device 20 to image the embossed tape 2 fed to the imaging region A10 after the intermittent feeding of the embossed tape 2 and the cover tape 3 is repeated. Then, the imaging control unit 206 stores the captured infrared image in the memory unit 202 in association with positions of the guide holes 6 (step S20).

The determination unit 210 determines states of the thermocompression-bonded regions 78b and 80b (see FIG. 5) by using the infrared image captured by the infrared imaging device 20. Further, the determination unit 210 detects a position state of the electronic component 4 by using the infrared image (step S30). Then, the display control unit 212 causes the display device 300 to display the infrared image and determination information (see FIG. 14) when the determination unit 210 detects an abnormality.

As illustrated in FIG. 14, an infrared image M12 (determined to be abnormal) and the determination information M14 are displayed in a display image M10 of the display device 300. The determination information M14 displays the location information for the guide holes 6 and a reason for abnormality (abnormality type).

A more detailed processing example of step S30 will be described with reference to FIG. 15. Initially, the binarization processing unit 210a extracts images of the compression bonding regions 78b and 80b from the infrared image and binarizes the images (step S100).

Next, the labeling processing unit 210b labels black portion regions as binarized by the binarization processing unit 210a. Then, the labeling processing unit 210b counts the number of pixels in the labeled black portion regions (step S102).

Next, the outer shape extraction processing unit 210c extracts circumscribed contour lines of image regions inside the compression bonding regions 78b and 80b (step S104).

Then, the determination processing unit 210d determines whether the processing appears normal (step S106). That is, when the number of pixels counted by the labeling processing unit 210b is greater than a first threshold value, the determination processing unit 210d determines that thermocompression bonding is in a good state (normal), and when right-angled contour lines in a predetermined direction are placed in the regions 76a, 76b, 76c, and 76d, the determination processing unit 210d determines that a position of the electronic component 4 is in a good state (normal) (Y in step S106). Then, the determination processing unit 210d ends the determination processing.

If the number of counted pixels is smaller than a second threshold value, the determination processing unit 210d determines that the compression bonding is in a failed state, and when the right-angled contour lines in a predetermined direction are not respectively placed in the regions 76a, 76b, 76c, and 76d, the determination processing unit 210d determines that a position of the electronic component 4 is in a failed state. When the thermocompression bonding is in a failed state or the position of the electronic component 4 is in a failed state, the determination processing unit 210d determines that processing is not normal (N in step S106).

Further, the determination processing unit 210d stores the position information of the guide holes 6 and a reason for abnormality in the memory unit 202 in association with each other (step S108). Then, the display control unit 212 causes the infrared image M12 that has been determined to be abnormal and the corresponding determination information M14 (see FIG. 14) to be displayed in the display image M10 of the display device 300 (step S110). Then, the determination processing unit 210d ends the determination processing.

As described above, according to the present embodiment, the infrared imaging device 20 images, with infrared light, the predetermined regions 78b and 80b in the embossed tape 2 in which the electronic component 4 can be inserted and the overlapped cover tape 3 is thermocompression-bonded in the predetermined regions 78b and 80b, and the determination unit 210 determines a state of thermocompression bonding of the predetermined regions 78b and 80b by using the infrared image captured by the infrared imaging device 20 by including at least a part of the predetermined regions 78b and 80b. Thereby, it is possible to determine a state of thermocompression bonding of the predetermined regions 78b and 80b based on information of the predetermined regions 78b and 80b in an infrared image.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An inspection system, comprising:
an infrared imaging device for acquiring an image of a thermocompression-bonded tape package with infrared light from a single direction, the thermocompression-bonded tape package comprising a first tape fused to a second tape, the first tape covering the second tape, and the second tape having a pocket for an electronic component;
a first reel to supply the first tape;
a second reel to supply the second tape;
an infrared light source positioned to provide the infrared light from the single direction for imaging by the infrared imaging device; and
a controller configured to receive the image of the thermocompression-bonded tape package and detect a defect in the thermocompression bonding in a predetermined region of the tape package based on a single received image, wherein
the first tape on the first reel comprises a resin material that is at least partially transparent to the infrared light, and
the second tape on the second reel comprises a resin material that absorbs the infrared light.

2. The inspection system according to claim 1, wherein the controller detects the defect in the thermocompression bonding based on image analysis of the predetermined region in the image to identify whether a number of dark pixels in the predetermined region is a threshold value or more.

3. The inspection system according to claim 2, wherein the controller detects the defect in the thermocompression bonding when the number of dark pixels in the predetermined region is less than the threshold value.

4. The inspection system according to claim 2, wherein the controller determines the thermocompression bonding to be normal if the number of dark pixels in the predetermined region is the threshold value or more.

5. The inspection system according to claim 1, further comprising:
a thermocompression bonding device configured to thermocompression bond the tape package at the predetermined region by fusing the first and second tapes with heat and pressure.

6. The inspection system according to claim 1, further comprising:
a third reel to which the thermocompression-bonded tape package is supplied.

7. The inspection system according to claim 1, wherein the second tape is a black resin material.

8. The inspection system according to claim 1, further comprising:
a tape advancement sprocket, wherein
the second tape has holes spaced at fixed intervals along the length of the second tape, and the tape advancement sprocket has teeth corresponding in position to the fixed intervals of the holes in the second tape.

9. The inspection system according to claim 1, wherein the controller is further configured to detect a state of the electronic component within the thermocompression-bonded tape package based on detection of corner positions of the electronic component in the acquired image.

10. The inspection system according to claim 9, wherein the corner positions include a position of an end of a lead of the electronic component.

11. The inspection system according to claim 10, further comprising:
a display screen, wherein
the controller is further configured to control the display screen to display information including the acquired image when either the defect is detected in the thermocompression bonding or a detected state of the electronic component within the thermocompression-bonded tape package is identified as abnormal.

12. The inspection system according to claim 1, further comprising:
a display screen, wherein
the controller is further configured to control the display screen to display information including the acquired image when the defect is detected in the thermocompression bonding is identified.

13. An inspection system, comprising:
a first reel to supply a first tape;
a second reel to supply a second tape having a pocket for an electronic component;
a thermocompression bonding device configured to thermocompression bond the first tape to the second tape at a predetermined region to form a tape package with the first tape covering the pocket of the second tape;
an infrared imaging device for acquiring an image of the tape package with infrared light from a single infrared light source positioned to supply the light from a single direction; and
a controller configured to receive the image of the tape package and detect a state of thermocompression bonding in the predetermined region of the tape package using just the received image, wherein
the first tape on the first reel comprises a resin material that is at least partially transparent to the infrared light, and
the second tape on the second reel comprises a resin material that absorbs the infrared light.

14. The inspection system according to claim 13, wherein the controller is further configured to detect a state of the electronic component within the tape package based on the acquired image.

15. An inspection method, comprising:
acquiring an image of a thermocompression-bonded tape package with infrared light from a single direction from a single infrared light source, the thermocompression-bonded tape package comprising a first tape fused to a second tape, the first tape covering the second tape, and the second tape having a pocket for an electronic component; and
receiving the image of the thermocompression-bonded tape package and detecting a defect in the thermocompression bonding in a predetermined region of the tape package based on a single received image, wherein
the first tape is transparent or semi-transparent to the infrared light, and
the second tape is a black resin that absorbs the infrared light.

16. The inspection method according to claim 15, further comprising:
detecting a positional state of the electronic component in the tape package based on the received image.

17. The inspection method according to claim 15, wherein the detecting of the defect in the thermocompression bonding and the detecting the positional state of the electronic component in the tape package uses only the single received image of the thermocompression-bonded tape package.

18. The inspection system according to claim 13, further comprising:
a display screen, wherein
the controller is further configured to control the display screen to display information including the just received image when the detected state of the thermocompression bonding is identified as defective.

19. The inspection system according to claim 13, further comprising:
a third reel to which the thermocompression-bonded tape package is supplied.

20. The inspection system according to claim 13, wherein the second tape is a black resin material.

* * * * *